United States Patent
Quarfordt et al.

(10) Patent No.: US 9,131,147 B2
(45) Date of Patent: Sep. 8, 2015

(54) SYSTEM AND METHOD FOR DETECTING AND ACTING ON MULTIPLE PEOPLE CROWDING A SMALL DISPLAY FOR INFORMATION SHARING

(75) Inventors: Pernilla Quarfordt, Los Altos, CA (US); Donald Kimber, Foster City, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 80 days.

(21) Appl. No.: 13/269,311

(22) Filed: Oct. 7, 2011

(65) Prior Publication Data

US 2013/0088605 A1 Apr. 11, 2013

(51) Int. Cl.
- H04N 5/232 (2006.01)
- H04W 4/00 (2009.01)
- H04W 8/00 (2009.01)
- H04L 29/08 (2006.01)

(52) U.S. Cl.
CPC ........ H04N 5/23219 (2013.01); H04L 67/1044 (2013.01); H04L 67/18 (2013.01); H04N 5/23229 (2013.01); H04W 4/008 (2013.01); H04W 8/005 (2013.01)

(58) Field of Classification Search
CPC .. H04N 2101/00; H04W 84/18; H04H 60/33; G06K 9/00778
USPC ...................................................... 348/207.1
See application file for complete search history.

(56) References Cited

U.S. PATENT DOCUMENTS

| | | | |
|---|---|---|---|
| 7,373,109 B2 * | 5/2008 | Pohja et al. | 455/41.2 |
| 2004/0263631 A1 * | 12/2004 | Brittan et al. | 348/207.1 |
| 2005/0237499 A1 * | 10/2005 | Oross et al. | 353/119 |
| 2006/0203758 A1 * | 9/2006 | Tee et al. | 370/315 |
| 2008/0085682 A1 * | 4/2008 | Rao | 455/74 |
| 2008/0244639 A1 * | 10/2008 | Kaaz | 725/34 |
| 2009/0030952 A1 * | 1/2009 | Donahue et al. | 707/203 |
| 2009/0185033 A1 * | 7/2009 | Nozaki | 348/77 |
| 2009/0241039 A1 * | 9/2009 | Estevez et al. | 715/757 |
| 2009/0322690 A1 * | 12/2009 | Hiltunen et al. | 345/173 |
| 2010/0311347 A1 * | 12/2010 | Le Thierry D'Ennequin et al. | 455/67.11 |
| 2011/0043643 A1 * | 2/2011 | Yu et al. | 348/207.1 |
| 2011/0072355 A1 | 3/2011 | Carter et al. | |
| 2011/0309946 A1 * | 12/2011 | Jonsson et al. | 340/686.6 |
| 2012/0147342 A1 * | 6/2012 | Lin et al. | 353/122 |
| 2012/0262494 A1 * | 10/2012 | Choi et al. | 345/672 |
| 2012/0330600 A1 * | 12/2012 | Kuo et al. | 702/150 |
| 2013/0027569 A1 * | 1/2013 | Parulski | 348/207.1 |

OTHER PUBLICATIONS

Nigel Davies, et al., "Using Bluetooth Device Names to Support Interaction in Smart Environments", Proceedings of MobiSys'09, 2009, pp. 151-164.

(Continued)

*Primary Examiner* — Roberto Velez
*Assistant Examiner* — Cynthia Segura
(74) *Attorney, Agent, or Firm* — Sughrue Mion, PLLC

(57) ABSTRACT

Systems and methods directed to detecting crowds and sharing content based on the devices in proximity to the detected crowd. Systems and methods may utilize a camera included in most mobile devices to estimate how many people are involved in an interaction with the mobile device. Depending on the number of people detected, the systems and methods may invoke appropriate actions. Appropriate actions may involve sharing information by various methods, such as sharing content on a large display, printing or emailing documents. The systems and methods may also be extended to generally detecting a crowd in proximity to a device, and invoking appropriate actions based on the number of people detected.

26 Claims, 7 Drawing Sheets

(56) References Cited

OTHER PUBLICATIONS

Wei You, et al., "Studying Vision-Based Multiple-User Interaction with In-home Large Displays", Proceedings of HCC'08, 2008, pp. 19-26.
T. Darrell, et al., "Integrated Person Tracking Using Stereo, Color and Pattern Detection", International Journal of Computer Vision, 2000, pp. 175-185, vol. 37, No. 2.
Daniel Vogel, et al. "Interactive Public Ambient Displays: Transitioning from Implicit to Explicit, Public to Personal, Interaction with Multiple Users", Proceedings of UIST'04, 2004, pp. 137-146, vol. 6, Issue 2.
Jacob T. Biehl, et al., "MyUnity: Building Awareness and Fostering Community in the Workplace", FXPAL Techreport, 2010.
OculisLabs, http://www.oculislabs.com/, 2007, (retrieved Oct. 6, 2011).
Kinect Controller for Xbox 360, http://www.xbox.com/en-US/kinect, 2011, (retrieved Oct. 6, 2011).

* cited by examiner

No distance to wall

5" distance from wall

10" distance from wall

SYSTEM AND METHOD FOR DETECTING AND ACTING ON MULTIPLE PEOPLE CROWDING A SMALL DISPLAY FOR INFORMATION SHARING

BACKGROUND OF THE INVENTION

1. Field

The exemplary embodiments described herein are directed to systems and methods for interacting with displays, and more specifically, for detecting and acting on multiple people crowding on a small display for information sharing.

2. Description of the Related Art

Present systems require manual actions to connect with public displays, such as connecting the device using appropriate cables, or utilizing BLUETOOTH manually to interact with public displays. In the latter systems, the user has to manually initiate the interaction by sending commands to the public display and by changing the name of the Bluetooth device. The device used by the user behaves passively until the user commands it to transmit to a public display by the user initiated interaction. Due to the passive nature of the device and interaction with the public displays, the present systems did not utilize any other components of the devices (e.g. such as cameras or crowd detection), to interact with the public display.

Present systems also utilize methods for detecting more than one person in front of a large display. The purpose of such systems is oftentimes to detect when people wish to interact with the large display, and the detection is centered on detecting people facing the display. Some systems use multiple-person identification and tracking to decide how to divide up a TV-display depending on how many people were attending the display. Some systems utilize an algorithm for multi-person tracking and include a module which detects faces in the video stream and distorts them. Interactive displays that showed different content depending on the person's proximity to the display also exist. Such interactive displays can take into account if several people were attending the display. However, the present systems are focused on clusters of people attending the public or large display, and are not concerned with clusters of people not attending the large display (e.g. being engaged with a different device away from the large display).

Face detection for detecting if multiple people are attending a display has been done for security purposes by present systems. Such systems include software to prevent shoulder surfing (when somebody is attending a screen over the shoulder of the user without the user's knowledge), which uses face recognition to blur content on the screen if the rightful owner is not attending the screen. Such systems thereby attempt to hinder information sharing rather than to promote it.

SUMMARY

Aspects of the exemplary embodiments include a mobile device, which may involve a camera; a crowd detection module estimating the number of people interacting with the mobile device based on images received by the camera; and a device detection module detecting available devices in proximity to the mobile device. If the estimated number of people exceeds a threshold, the mobile device may construct a list of possible devices for content sharing from the available devices.

Aspects of the exemplary embodiments may further include a method which may involve estimating a number of people interacting with a first device; detecting available devices in proximity to the first device; and constructing a list of possible devices for content sharing from the available devices when the estimated number of people exceeds a threshold.

Aspects of the exemplary embodiments may further include a system. The system may include a sensor, a crowd detection module estimating a number of people in proximity to a device based on data received from the sensor; and a transmission module transmitting content to be shared to the device when the estimated number of people exceeds a threshold.

It is to be understood that both the foregoing and the following descriptions are exemplary and explanatory only and are not intended to limit the embodiments or the application thereof in any manner whatsoever.

BRIEF DESCRIPTION OF THE DRAWINGS

The accompanying drawings, which are incorporated in and constitute a part of this specification exemplify the embodiments and, together with the description, serve to explain and illustrate principles of the inventive technique. Specifically.

DETAILED DESCRIPTION OF THE INVENTION

Figure 1:
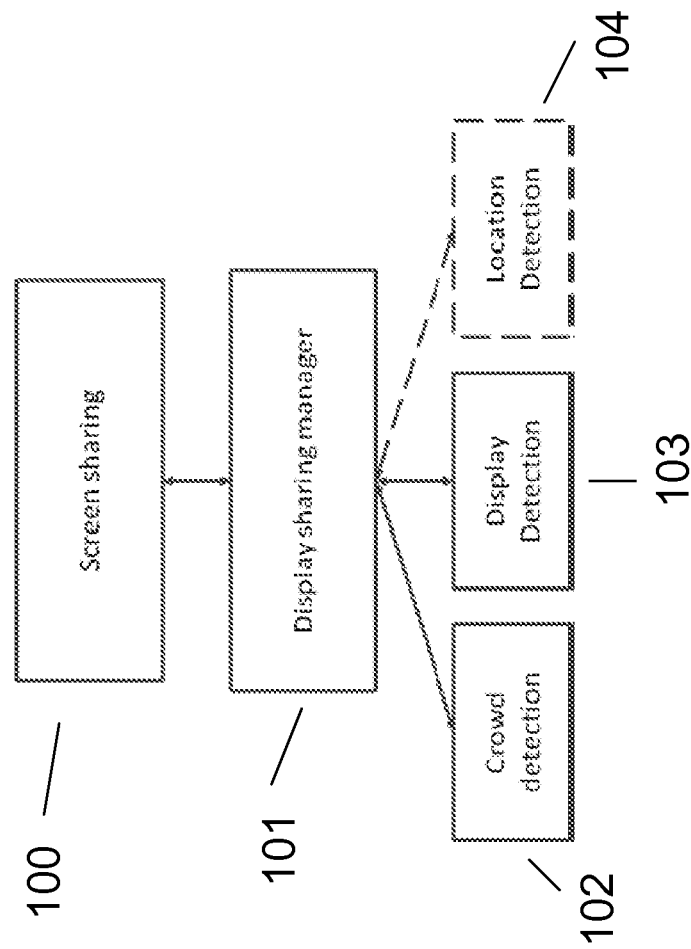
FIG. 1 illustrates a general system architecture according to exemplary embodiments.

In the following detailed description, reference will be made to the accompanying drawings, in which identical functional elements are designated with like numerals. The aforementioned accompanying drawings show by way of illustration, and not by way of limitation, exemplary embodiments and implementations consistent with principles of the exemplary embodiments. These implementations are described in sufficient detail to enable those skilled in the art to practice the invention and it is to be understood that other implementations may be utilized and that structural changes and/or substitutions of various elements may be made without departing from the scope and spirit of exemplary embodiments. The following detailed description is, therefore, not to be construed in a limited sense. Additionally, the exemplary embodiments as described may be implemented in the form of software running on a general purpose computer, in the form of a specialized hardware, or combination of software and hardware.

The exemplary embodiments are directed to detecting crowds and transmitting shared content to an appropriate device if a crowd is detected. The shared content is transmitted seamlessly to an appropriate device (e.g. a larger display, a printer, etc.) to share the content with the crowd. The exemplary embodiments described herein attempt to facilitate information sharing rather than to hinder it, as has been previously done. The exemplary embodiments utilize crowd detection for initiating content sharing between a mobile device and a nearby larger display or other appropriate device. For example, the crowd detection can be done either by a sensor connected to a larger display, to a mobile device or to both a large display and a mobile device. Preferably, the display should be sufficiently large (e.g. greater than 12" diagonally) in order to adequately display the information of the mobile device to the crowd. The exemplary embodiments are also directed to finding clusters of people not attending a large display and using that information for invoking actions. Present systems do not currently provide a seamless and ad hoc connection of a mobile device to a large display or other devices, nor do present systems attempt to use crowd detection for initiating actions on a mobile device, such as connecting it to large nearby display or other device.

In meetings, either planned or ad hoc, people often show information displayed on a small screen from a personal laptop or some other mobile device. The smaller size of the display in a mobile device, such as a personal laptop, a mobile phone or other device, is not normally optimal for showing information to a group of people. However, people tend to use the smaller displays on such devices rather than to find a way to display the content on a nearby larger display. Because present systems require extensive user interaction to connect to a different display, most users do not attempt to connect their device to a larger display, as doing so would interrupt the conversation and disturb the flow of the collaboration.

Exemplary embodiments attempt to deal with the above situation by detecting the number of people attending the user mobile device. If the number of detected people exceeds a threshold, the various embodiments may suggest and/or display information on, a nearby large display for more convenient sharing of content. The threshold can be preset by the user or determined based on the content being shared by the device. When the device is removed or out of range from the nearby large display, the connection to the larger display is automatically broken to preserve the integrity of the information on the personal device.

The exemplary embodiments are not limited to having the information shared on a larger display. Other devices could be utilized to share the information on the smaller display. For example, close-by printers could be identified and content printed with an appropriate number of copies based on the detected number of people. Nearby mobile devices, such as the mobile devices in possession by the users in the crowd, can also be used to share the information amongst the crowd. If the information to be shared is an audio presentation, the various embodiments may attempt to connect to larger audio speakers or other devices to have the audio presentation effectively presented. Fax machines may also be engaged as needed.

Detecting a crowd attending a device can be useful not only for displaying information on shared displays, but also for protecting sensitive information displayed on the screen of the device. For example, it can be utilized to limit access to the information on the large display when people are dispersed in the room but allow more detailed access if people are crowding a small display containing the detailed information. The user can also indicate on the user device which of the content displayed on the user device will be transmitted to the larger display, should the user not wish to share everything being displayed on the user device. This can be achieved by selecting a region on the display of the user device or other methods.

Various embodiments may further utilize three services; one service for detecting crowds, one for detecting the location of devices and nearby displays or printers or other devices for sharing content, and finally a service for displaying content from a device on a selected display or printer or other device for sharing content. In addition, the various embodiments may further utilize display sharing manager that coordinates information from the three services and decides on appropriate actions.

Detection of crowds can be done using several different methods. The detection can either be done on the mobile device, such as a laptop, smart phone or a tablet computer, (device-centric) or by sensors placed in the environment in the proximity of a large display capable of displaying material from a mobile device (display-centric). The various embodiments may also combine the two approaches depending on the desired implementation.

When a device-centric approached is used, one method for crowd detection is to use the device's built-in front-facing camera to detect the number of faces visible. When the number of faces captured exceeds a threshold, the display sharing manager is thus informed.

Other methods for detecting crowds are also possible. For instance, instead of detecting faces, the detection algorithm may detect eyes or other facial features. If the device could detect the gaze direction as well as the eyes, the estimation of how many people is attending the device would be more precise.

The methods for detecting crowds can be improved by adding tracking to determine if the detected people are moving out of sight to allow others in the crowd to have a good view of the device's screen. The crowd detection can also be combined with various motion sensors to determine if the people are moving around or if the device is moved around to allow more people a view of the device's screen. This would allow the detection methods to estimate how many people are crowding a display while the device is moved around to allow a better viewing angle for everybody in the crowd. When several sensors are used, a simple threshold mechanism may not be appropriate. Instead, the data from the sensors can be fused using a classifier with the purpose of detecting patterns in the data indicative of information sharing using the device's display.

When a display centric method is used, sensors in proximity of a large display would be used for detecting crowds. One possible method is to use video cameras, or devices such as a KINECT, to track and detect crowds.

Devices and large displays need to locate each other when a crowd is detected to be able to share content. The various embodiments may utilize several possible methods for locating devices or displays, as indicated below.

In one exemplary implementation of a device centric approach for crowd detection, the various embodiments detect nearby Bluetooth nodes and keep a list of nodes that are attached to a large display. If there is more than one display close by, the user may be given an option of which display to connect to. Other proximity sensors can be used such as a RFID tag, near-field radios etc.

Various embodiments may utilize other methods for detecting nearby displays if the device and the large displays are aware of their locations. In an exemplary implementation, the device can compare the location information from the display with its own to exclude displays that are not located inside the same room as the device.

With a display centric approach, when a crowd is detected by the large display, various embodiments may inform nearby devices, or, if precise location information is available, devices present in the same room as the large display. The devices in the room detecting crowds or alternatively people interacting with the devices of the room, could ask the users if information should be displayed on the large display. An example implementation can be a large public hall at a conference, with sensors arranged around the hall to detect crowds, and a large display that displays shared content. If the sensors detect a crowd as being in proximity to one of the devices in the hall, content may be shared onto the device in proximity to the crowd (e.g. a smaller display, a printer, etc.).

FIG. 1 illustrates a general system architecture according to exemplary embodiments. The general system architecture may involve a screen sharing module 100, a display sharing manager 101, a crowd detection module 102, and a display detection module 103. Optionally, a module for location detection 104 may be used in systems where the location of the crowd or device may be important.

The crowd detection module 102 is utilized to detect crowds. A crowd is detected when the number of faces exceeding a threshold is found. Various face detection algorithms or crowd detection methods can be used. When the crowd detection detects a crowd, the various embodiments may inform the display sharing manager 101 of the crowd. In parallel, a display detection module 103 may scan the area for Bluetooth nodes that are identified as displays. When displays are detected, the display detection module informs the display sharing manager 101. When the display sharing manager 101 is informed that a crowd is detected and large displays are close-by, it asks the user if the content on the device's screen should be displayed on the large display detected. If more than one display is detected, the user is given an option of displays to choose from.

If the user chooses to share the screen with the large display, the display sharing manager 101 may utilize screen sharing software to share the screen with a particular display.

When the display detection module 103 detects that the display is not nearby anymore, such as when the user leaves the room with the device, it informs the display sharing manager 101 which in turn informs the user with the choice of staying connected or disconnecting from the display. If no response is given within a set time frame, the system automatically disconnects from the large display.

Sharing by printing content could be accomplished by using the device-centric approach described above. The difference would be that close-by printers rather than displays (or in combination to displays) can be identified. The printers are provided with the same kind of identifiers associated with them as with the large displays. These can be Bluetooth tags, RFID-tags, near field radios or similar technology. A display-centric approach is also possible depending on the situation. If the printers are stored in a separate printing room, it may be preferable to utilize a device-centric approach.

When sharing information by electronic documents via for instance email, it may be beneficial to find out the identity of the people in the crowd. Knowing the identity of the other people would allow more seamless sharing since the user would not need to enter each email-address to share the content. A combination of methods could be used to identify people in the crowd. The face detection algorithm could be enhanced to include a face recognition module. This module could identify known faces. The exemplary embodiments may thereby e-mail the shared content directly to the identified users, or transmit the content to their user devices.

Exemplary embodiments can also transmit shared content to detected user devices in proximity to the shared display, even without identifying the people in the crowd. Since most people today carry devices, the user devices of the people in the crowd could be detected and information could be shared directly with these devices, either by email or direct document sharing via for instance Bluetooth. In addition, the same screen sharing that is done with the large display, could be broadcasted to all close-by devices. If a person walks out of the proximity of the device broadcasting its screen, the connection would be broken to preserve the integrity of the information.

The content being shared may be abstracted from the activity rather than being the same view or document that is displayed on a device. In this scenario, the fact that a number of people are crowding up could be used in an awareness system. If the identity of the people in the crowd can be established, this information could be provided through the awareness system.

For the device-centric approach, one limitation with using faces to detect crowds is the angle of the built-in camera aimed to capture the user, as well as how the camera angle covers the viewing angle of the built-in display. If the viewing angle of the display is significantly larger than what the built-in camera can capture, people could easily view the display without being captured by the camera. However, this may be a limitation of present devices. Future devices may include a wide angle camera to make video conferencing easier so that the user does not need to think about how the device is positioned to capture the user's face.

Figure 2A:
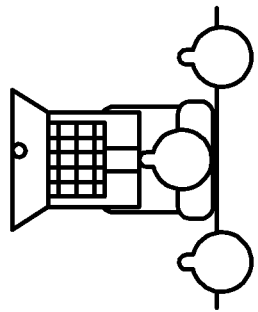
FIGS. 2a to 2c illustrate examples of detecting faces by a camera, in accordance to exemplary embodiments.
Figure 2A:
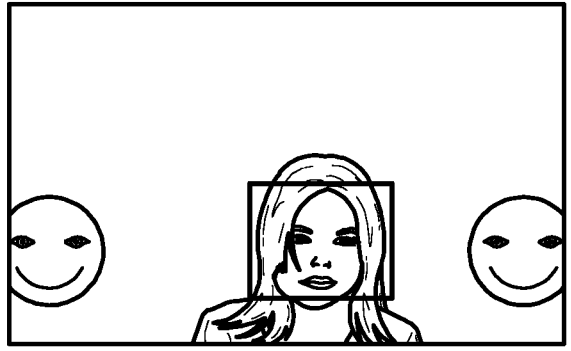
Figure 2B:
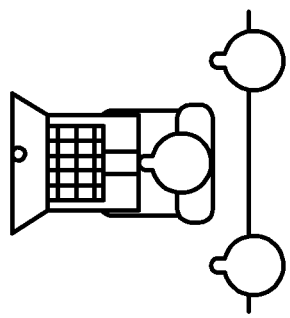
Figure 2B:
Figure 2C:
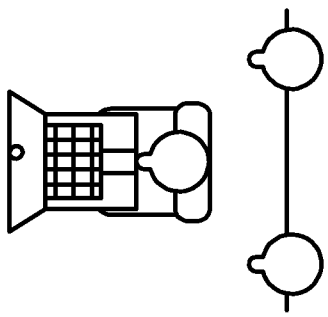
Figure 2C:
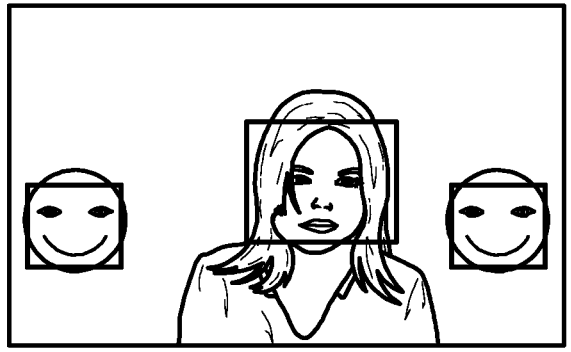

As a basis, a small test was performed to examine the field of view of a built-in camera in a laptop as shown in FIGS. 2a to 2c. The resolution of the particular camera used is 320×240 pixels. The test was done by attaching three faces cut out from paper. Each of the faces was made as an oval that would fit in a bounding box of 20×25 cm (circa 8"×10"). The three faces were spaced 8" (20 cm) apart. A person was placed in front of the center face with the laptop on her lap and the display oriented with a good viewing angle. The images were captured from the built-in camera at three different distances, as shown in FIGS. 2a to 2c.

The test showed that when the central person is against the wall in FIG. 2a, or at 5" from the wall as shown in FIG. 2b, the fake faces were partly visible in the captured image. The three pairs of eyes and one month were fully visible, although one eye was very close to the edge of the image. This result occurred all the way up to a distance of 8" from the wall. At 10" from the wall as shown in FIG. 2c, both fake faces were completely visible, and were detected by a face detection algorithm. When people crowd a small display in order to see better, they will often use the space behind the person driving the computer. Although as FIGS. 2a to 2c illustrate, false positives were generated from the fake faces for testing purposes, other face detection algorithms, or just improved face classifiers may be employed to improve the performance of the face detection algorithm.

Figure 3:
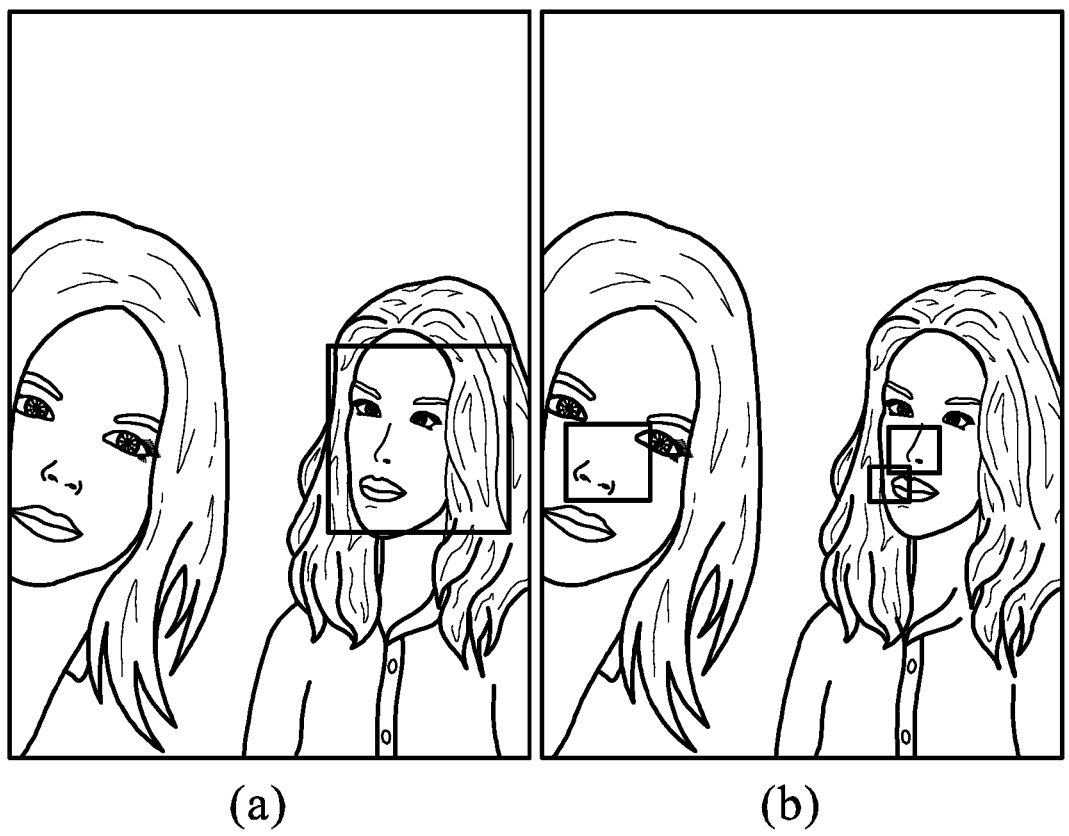
FIGS. 3a and 3b illustrate examples of detecting people by a camera, in accordance to exemplary embodiments.
Figure 4:
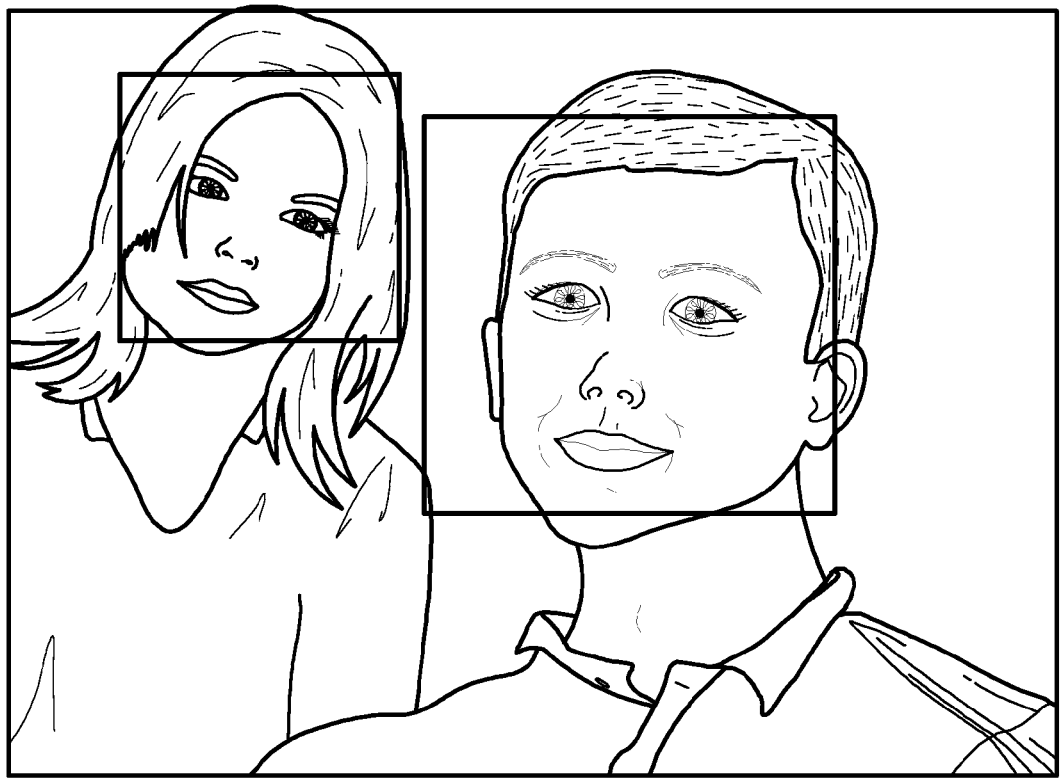
FIG. 4 illustrates an example of detecting people by a camera, in accordance to exemplary embodiments.

In addition to the test with a laptop, photos were also captured and tested by using an IPHONE and IPAD when simulating showing something on the device for a second person. FIGS. 3a and 3b illustrate images captured by the IPHONE and FIG. 4 shows an image captured using an IPAD. In FIG. 3a, a face detection algorithm is used, whereas in FIG. 3b, a nose detection algorithm is used.

Figure 5:
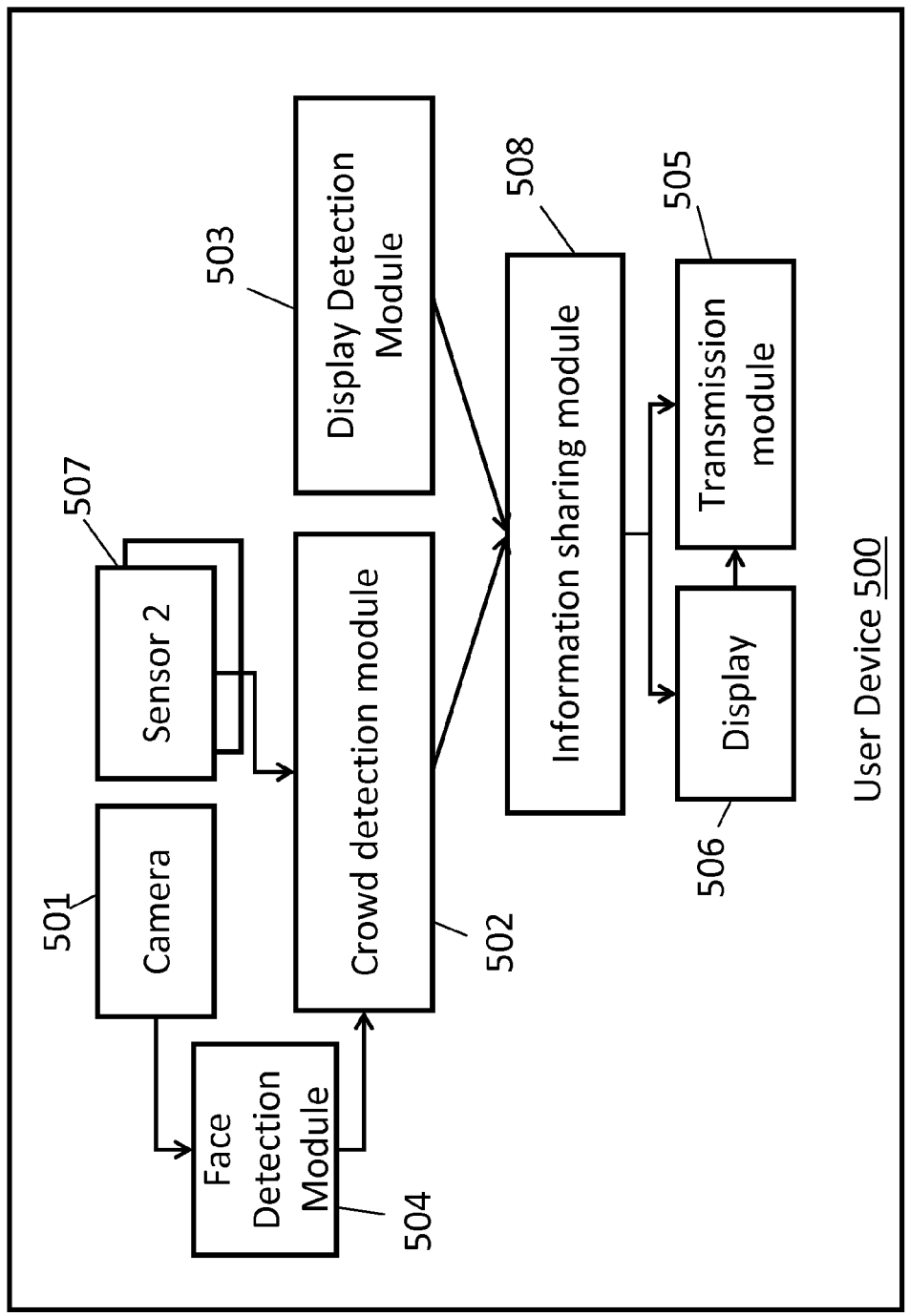
FIG. 5 illustrates an exemplary functional diagram on which exemplary embodiments may be implemented.

FIG. 5 illustrates an exemplary functional diagram on which exemplary embodiments may be implemented. A user device 500 may include a camera 501, along with a crowd detection module 502 and a device or display detection module 503. The camera 501 may be used to receive images and the crowd detection module 502 may use these images in conjunction with one or more sensors 507 to estimate a number of people interacting with the user device 500. The device detection module 503 may detect available devices in proximity to the user device. If the estimated number of people exceeds a threshold, a list of appropriate devices for content sharing may be constructed from the available devices, which may be displayed on a display 506. Various factors or filters can be applied to determine what devices are appropriate. For example, the list of appropriate devices could constitute all detected devices. The list can also be restricted based on proximity to the user device, or to require location within the same room as the user device. Some devices may be inadequate for sharing content if the number of detected users is large, thereby disqualifying them from the list. Some devices may be security restricted and therefore inappropriate for use in sharing content, thereby being excluded from the list. As described above, the list of appropriate devices can also include the devices owned by the identified users, if a face recognition module 504 is employed. A transmission module 505 may also be employed to transmit shared content to the appropriate device or devices as directed by the information sharing module 507. Modules described herein may be software modules that are executed by one or more processors.

Figure 6:
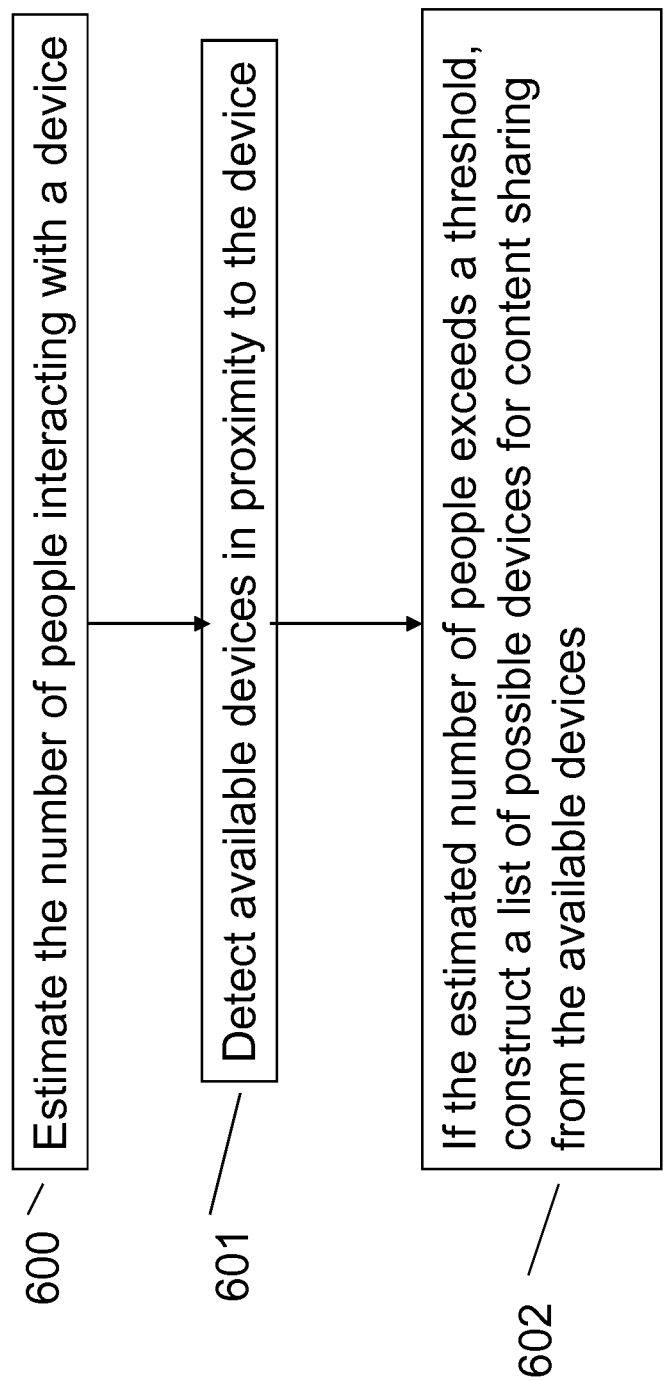
FIG. 6 illustrates an exemplary flow chart according to an exemplary embodiment.

FIG. 6 illustrates an exemplary flow chart according to an exemplary embodiment. Systems executing in accordance to exemplary embodiments of the invention may estimate a number of people interacting with a device 600, then attempt to detect available devices in proximity to the device 601. If the estimated number of people exceeds a threshold, exemplary embodiments may construct a list of possible devices for content sharing from the available devices 602.

Figure 7:
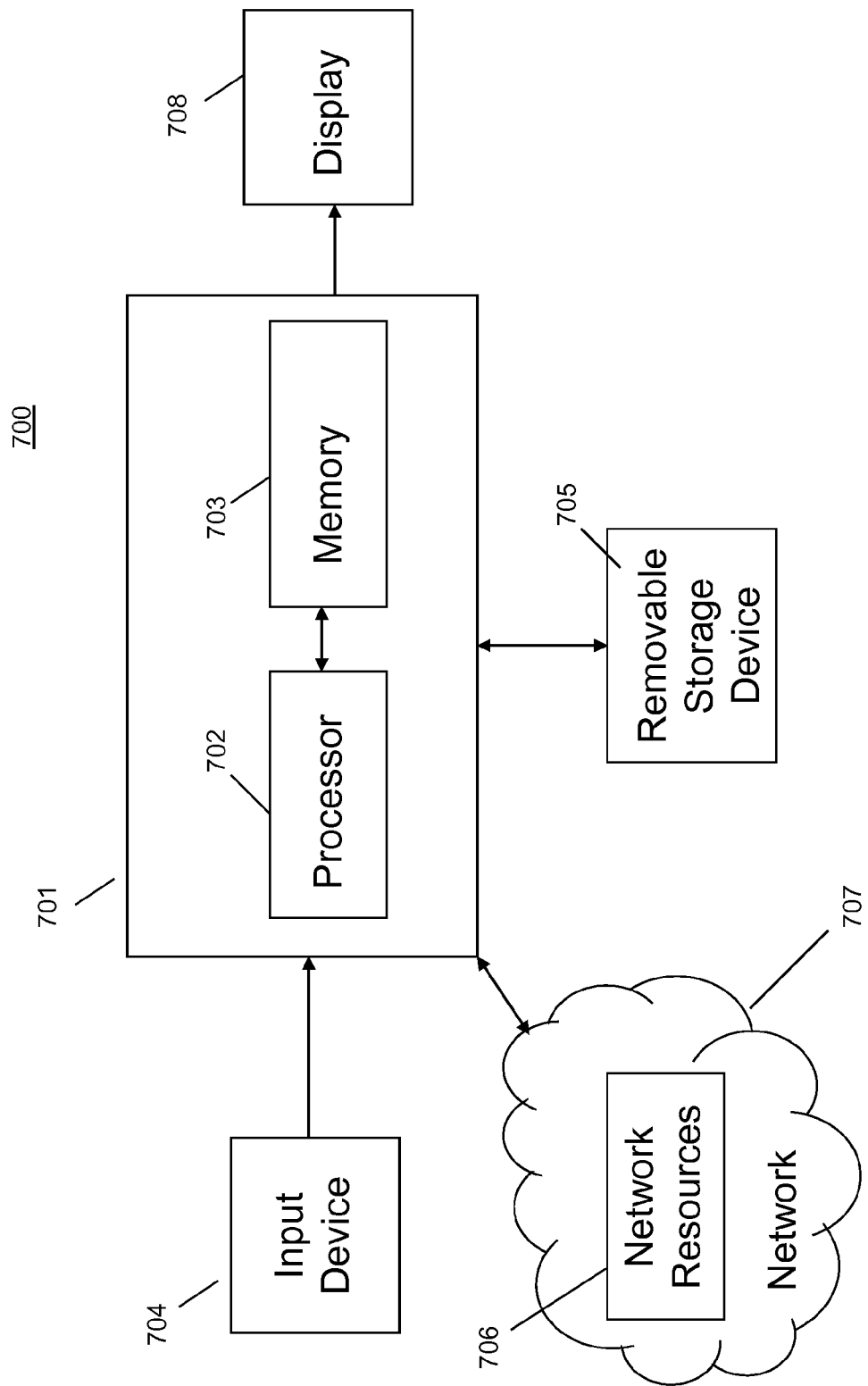
FIG. 7 is a block diagram that illustrates an embodiment of a computer/server system upon which an embodiment of the inventive methodology may be implemented.

FIG. 7 is a block diagram that illustrates an embodiment of a computer/server system 700 upon which an embodiment of the inventive methodology may be implemented. The system 700 includes a computer/server platform 701 including a processor 702 and memory 703 which operate to execute instructions, as known to one of skill in the art. The term "computer-readable medium" as used herein refers to any medium that participates in providing instructions to processor 702 for execution. Additionally, the computer platform 701 receives input from a plurality of input devices 704, such as a keyboard, mouse, touch device or verbal command. The computer platform 701 may additionally be connected to a removable storage device 705, such as a portable hard drive, optical media (CD or DVD), disk media or any other medium from which a computer can read executable code. The computer platform may further be connected to network resources 706 which connect to the Internet or other components of a local public or private network. The network resources 706 may provide instructions and data to the computer platform from a remote location on a network 707. The connections to the network resources 706 may be via wireless protocols, such as the 802.11 standards, Bluetooth® or cellular protocols, or via physical transmission media, such as cables or fiber optics. The network resources may include storage devices for storing data and executable instructions at a location separate from the computer platform 701. The computer interacts with a display 708 to output data and other information to a user, as well as to request additional instructions and input from the user. The display 708 may therefore further act as an input device 704 for interacting with a user.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A mobile device, comprising:
   at least one hardware processor;
   a camera; and
   a display configured to display content,
   wherein the at least one hardware processor is configured to execute:
      a crowd detection software processor configured to perform image analysis on images received by the camera and estimate, based on the image analysis performed on the images received by the camera, a number of people viewing the content displayed on the display of the mobile device;
      a device detection software processor that, in response to the number of people estimated by the crowd detection processor exceeding a threshold, is configured to detect at least one available device in proximity to the mobile device that is capable of receiving the content displayed on the display of the mobile device; and
      a transmitter configured to transmit the content that is displayed on the display of the mobile device to one of the at least one available device.

2. The mobile device of claim 1, wherein the device detection software processor is configured to construct a list of the at least one available device based on detected devices in proximity to the mobile device that are capable of receiving the content that is displayed on the display of the mobile device.

3. The mobile device of claim 2, wherein the transmitter connects to a display in the list of possible devices larger than the display of the mobile device to display the content that is shared from the mobile device.

4. The mobile device of claim 2, wherein the transmitter connects to a printer in the list of possible devices to print the content that is shared from the mobile device.

5. The mobile device of claim 2, wherein the display is configured to display a prompt for receiving a selection of the one of the possible devices.

6. The mobile device of claim 2, further comprising a face recognition software processor configured to use the at least one hardware processor to identify the number of people viewing the content displayed on the display of the mobile device;
   wherein the list of possible devices comprises devices in possession of the identified number of people;
   wherein the transmitter transmits to all the devices in possession of the identified number of people.

7. The mobile device according to claim 2, wherein the device detection software processor detects nearby nodes supporting short-range wireless interconnection and constructs the list of possible device using the detected nearby nodes supporting short-range wireless interconnection.

8. The mobile device according to claim 2, wherein the device detection software processor detects nearby radio-frequency identification (RFID) tags and constructs the list of possible device using the detected nearby RFID tags.

9. The mobile device according to claim 2, wherein the device detection software processor detects nearby near-field radios and constructs the list of possible device using the detected nearby near-field radios.

10. The mobile device of claim 1, wherein the image analysis performed by the crowd detection software processor on the images received by the camera comprises detecting a number of faces visible in the images received by the camera.

11. The mobile device according to claim 1, wherein the crowd detection software processor, in response to the images received by the camera showing the people viewing the display of the mobile device moving out of sight to allow other people to view the display of the mobile device, determines that the people are viewing the display of the mobile device.

12. The mobile device according to claim 1, wherein the crowd detection software processor, in response to the images received by the camera showing the mobile device being moved to allow other people to view the display of the mobile device, determines that the people are viewing the display of the mobile device.

13. The mobile device according to claim 1, wherein the mobile device is a laptop computer.

14. The mobile device according to claim 1, wherein the mobile device is a mobile phone.

15. The mobile device according to claim 1, wherein the image analysis performed by the crowd detection software processor on the images received by the camera comprises detecting eyes or other facial features in the images received by the camera.

16. A method comprising:
receiving images by a camera;
performing image analysis on the images received by the camera;
estimating, based on the image analysis performed on the images received by the camera, a number of people viewing content displayed on a display of a first device;
in response to the estimated number of people exceeding a threshold, detecting at least one available device in proximity to the first device that is capable of receiving the content displayed on the display of the first device; and
transmitting the content that is displayed on the display of the first device to a second device that is one of the at least one available device.

17. The method of claim 16, further comprising:
constructing a list of the at least one available device based on detected devices in proximity to the first device that are capable of receiving the content that is displayed on the display of the first device.

18. The method of claim 17, wherein the second device is a display larger than the display on the first device, and wherein the transmitting content that is shared from the first device to the second device further comprises connecting to the second device to display the content that is shared from the first device.

19. The method of claim 17, wherein the second device is a printer, and wherein the transmitting content that is shared from the first device to the second device further comprises connecting to the printer to print the content that is shared from the first device.

20. The method of claim 17, further comprising providing a prompt displaying the list of possible devices and receiving a selection of one of the list of possible devices as the second device.

21. The method of claim 17, wherein the list of possible devices comprises devices in the possession of the number of people viewing the display of the first device.

22. A system, comprising:
at least one hardware processor; and
a camera,
wherein the at least one hardware processor is configured to execute:
a crowd detection software processor configured to perform image analysis on images received by the camera and estimate, based on the image analysis performed on the images received by the camera, a number of people in proximity to a device that is capable of receiving content that is displayed on a first display of a mobile device; and
a transmitter that, in response to the estimated number of people exceeding a threshold, is configured to transmit the content that is displayed on the first display of the mobile device to the device.

23. The system of claim 22, wherein the device is a printer, and wherein the transmitter is configured to transmit content that is shared from the mobile device by connecting to the printer to print the content that is shared.

24. The system of claim 22, wherein the device is a second display, and the transmitter is configured to transmit the content displayed on the first display to the second display.

25. The system of claim 22, wherein in response to the estimated number of people falling below a threshold, the transmitter is configured to cease transmission of the content that is shared to the device.

26. The system of claim 22, wherein the device is an audio system, and wherein the transmitter is configured to transmit content that is shared from the mobile device by transmitting audio that is shared to the audio system.

* * * * *